March 18, 1924.
A. M. DIXON
1,487,151
WINDSHIELD DEVICE FOR AUTOMOBILES
Filed Jan. 3, 1921
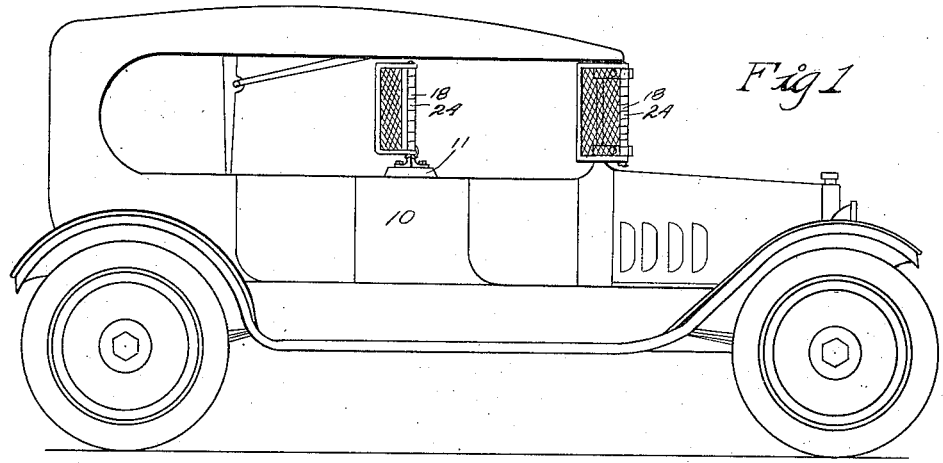
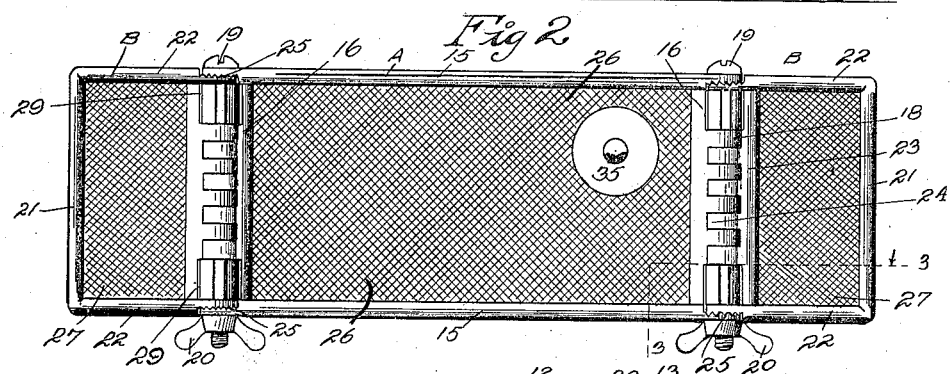
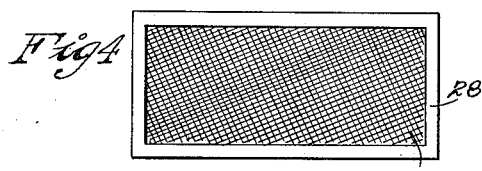
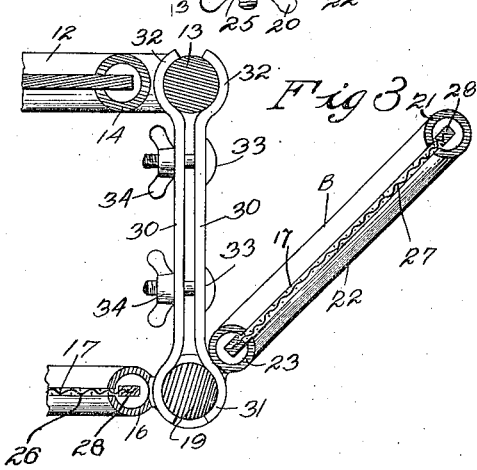
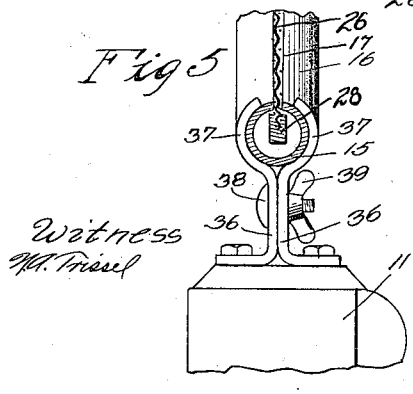
Inventor
Alvin M. Dixon
By Bair & Freeman
Attorneys Patented Mar. 18, 1924.

1,487,151

UNITED STATES PATENT OFFICE.

ALVIN M. DIXON, OF DES MOINES, IOWA.

WINDSHIELD DEVICE FOR AUTOMOBILES.

Application filed January 3, 1921. Serial No. 434,573.

*To all whom it may concern:*

Be it known that I, ALVIN M. DIXON, a citizen of the United States, and a resident of Des Moines, in the county of Polk and State of Iowa, have invented a certain new and useful Windshield Device for Automobiles, of which the following is a specification.

The object of my invention is to provide a wind shield device for automobiles or the like, which may readily and easily be installed on the present ordinary type of wind shields now in general use, and which is of simple, durable and inexpensive construction.

More particularly my invention relates to a device which will serve as a wind break and yet permit fresh air to pass therethrough, whereby the occupants of the automobile may not be subjected to a draft, but merely have a circulation of air passing around them.

Still another object is to provide a device adapted to be attached to the wind shield of an automobile having a pair of end members capable of pivotal movement on a vertical axis whereby they may be adjusted to various positions for shutting off a draft of air from a certain place.

Still another object is to provide an attachment for wind shields in which wire screen is used as a wind break, the parts being so arranged that the wire screen may be easily removed from the frame and a new screen placed therein as desired.

Still another object is to provide the device with such a clamping member as to make it possible to be secured to the back of the front seat of an automobile.

It will be understood that my device may be fixed to the wind shield of an automobile or to the back of the front seat of an automobile as is desired.

With these and other objects in view, my invention consists in the construction, arrangement and combination of the various parts of my device, whereby the objects contemplated are attained, as hereinafter more fully set forth, pointed out in my claim and illustrated in the accompanying drawings, in which:

Figure 1 is a side elevation of an automobile with my improved wind shield device attached to a wind shield, and also to the back of the front seat of the automobile.

Figure 2 is a front elevation of my device.

Figure 3 is a central, sectional view taken on the line 3—3 of Figure 2.

Figure 4 is a front elevation of the screen and a frame for retaining the same; and Figure 5 is a detail, sectional view showing the clamp for securing the device to the back of the front seat of an automobile.

In the accompanying drawings I have used the reference numeral 10 to indicate generally an automobile body which is provided with a back 11 of the front seat and also is provided with a wind shield 12, which includes a stationary frame member 13 and the movable glass retaining frame 14.

The wind shield is of the ordinary construction now used upon substantially all makes of automobiles.

My improved device includes a rectangular main frame A and a pair of smaller frames B. The smaller frames B are pivoted on the sides of the main frame A and are capable of swinging movement relative to the main frame A.

The main frame A includes a pair of horizontal tubular shaped members 15, and a pair of vertical spaced tubular shaped members 16. Each of the members 15 and 16 are split as at 17, the purpose of which will be hereafter more fully set forth.

Each of the members 16 are provided with spaced loops 18 through which are extended the bolts 19, which are provided with the wing nuts 20.

The frame members B include a tubular shaped member 21 bent between its ends and at right angles so as to provide the portions 22. Extended between the ends of the portions 22 is a member 23 which has spaced loops 24 thereon, which are similar to the loops 18 and are also designed to have the bolts 19 extend therethrough.

The loops 18 and 24 form a hinged member so as to permit hinged or pivotal movement of the frame B relative to the frame A.

The ends of the members 15 and the ends of the members 22 are provided with co-acting corrugated portions 25.

By loosening the wing nut 20 the co-acting corrugated portions 25 will not engage and thus permit the hinged movement of the parts relative to each other.

The parts, however, may be locked by tightening the wing nut 20.

The ends of the members 23 and 16 are removably mounted in the members 22 and 15 respectively.

From the construction of the parts just described it will be seen that I have provided substantially three rectangular frame members each of which are provided with a screen.

The screen in the frame A is referred to by the reference numeral 26 while in the frames B by the reference numeral 27.

The screens 26 and 27 are provided with a binding 28 which is crimped in place so as to clamp the edges of the screen. It serves as a frame and holds the screen in taut position.

By removing the members 23, the screen may be removed by forcing the binding 28 past the edges of the slot 17. In this connection it may be stated that the slots 17 are a trifle smaller than the thickness of the binder 28, but are sufficiently large to allow the binding to be forced therethrough.

The frame B which includes the members 21, 22 and 23 has each of its members provided with a split portion 17 similar to the split portion 17 in the members 15 and 16.

The binding 28 on the screen 26 and 27 are forced through the split portion 17 of their respective frames and in this way the screen is rigidly fixed in the frame members A and B. In Figure 5 it is shown how the binding 28 of the screen is received within the frame members.

Each of the members 16 and 23 are provided with slots 29 which slots are adjacent to the bolt 19 which serves as a pintle. A pair of clamp members 30 are used for fastening my device to the wind shield, the clamp members 30 have curved engaging portion 31 which extends through the slots 29 on each side of the bolt 19 for engaging the bolt 19.

The opposite ends of the clamp members 30 are provided with a similar curved portion 32 which engages the fixed frame 13 of the wind shield 12.

Bolts 33 having wing nuts 34 thereon hold the clamp members together and in engagement with the frame 13 of the wind shield and also with the bolt 19.

From the construction of the clamp device it will be seen that my device is rigidly fixed to the wind shield and yet I am able to swing the frame members B on the pintle which is the bolt 19.

It will be understood that in the drawings I have shown the wind shield device as extending forwardly of the wind shield device of the automobile, but it will be understood that my device may either be extended in front of the wind shield or behind the wind shield as is desired.

Fixed to the screen 26 is an anti-glare lens 35 which is fixed substantially in front of the driver of the automobile.

With my device the ordinary glass wind shield may be moved to open position so that a circulation of air will be permitted to pass in upon the occupants of the car, yet no severe draft or wind will strike them.

My device will also prevent bugs from passing in among the occupants of the car when the wind shield is held in its open position.

It will also be understood that my device may be fixed to the back of the front seat of the automobile and when it is desired to be used in this way I have provided a pair of clamp members 36 which are fixed to the back of the front seat in any suitable manner and provided with a pair of curved portions 37 which engage the lower member 15 of the frame A.

A bolt 38 and a wing nut 39 is used for clamping the clamp members 36 together so that they will hold the wind shield device in the desired position.

It will be seen that I have provided a device which may readily and easily be adjusted to various positions so that it may be used for preventing a direct draft of air from blowing in upon the occupants of the automobile.

Some changes may be made in the construction and arrangement of the various parts of my device without departing from the real spirit and purpose of my invention, and it is my intention to cover by my claim any modified forms of structure or use of mechanical equivalents which may be reasonably included within their scope.

I claim as my invention:

In a wind shield device, a frame composed of tubular members, slots in said tubular members, a screen mounted in said frame, binder strips on the edges of said screen, the binder strips being received within the tubular members, and the screen extending through the slots therein, said binder strips being of slightly greater thickness than the slots, whereby the binder strips may be forced through the slots and thereafter be securely held in place, said binder strips forming a rigid frame enclosing the screen.

Des Moines, Iowa, December 17 1920.

ALVIN M. DIXON.